(12) United States Patent
Wolkerstorfer

(10) Patent No.: US 8,740,542 B2
(45) Date of Patent: Jun. 3, 2014

(54) METHOD FOR INTRODUCING LOADING AUXILIARY MEANS OF TRANSPORT DEVICE

(75) Inventor: Christoph Wolkerstorfer, Wels (AT)

(73) Assignee: TGW Mechanics GmbH, Wels (AT)

( * ) Notice: Subject to any disclaimer, the term of this patent is extended or adjusted under 35 U.S.C. 154(b) by 599 days.

(21) Appl. No.: 12/734,990

(22) PCT Filed: Dec. 19, 2008

(86) PCT No.: PCT/AT2008/000467
§ 371 (c)(1),
(2), (4) Date: Jun. 8, 2010

(87) PCT Pub. No.: WO2009/079678
PCT Pub. Date: Jul. 2, 2009

(65) Prior Publication Data
US 2010/0290874 A1      Nov. 18, 2010

(30) Foreign Application Priority Data
Dec. 21, 2007   (AT) .................................. A 2102/2007

(51) Int. Cl.
*B65G 1/04* (2006.01)

(52) U.S. Cl.
USPC .......................................... 414/807; 414/280

(58) Field of Classification Search
USPC ................................................ 414/280, 807
See application file for complete search history.

(56) References Cited

U.S. PATENT DOCUMENTS

| | | |
|---|---|---|
| 3,596,789 A | 8/1971 | Aaronson et al. |
| 3,883,008 A | 5/1975 | Castaldi |
| 5,009,509 A | 4/1991 | Matoushek et al. |
| 5,070,992 A | 12/1991 | Bonkowski |
| 5,839,872 A * | 11/1998 | Goto et al. ..................... 414/280 |
| 6,112,915 A | 9/2000 | Lewis |
| 6,431,378 B1 | 8/2002 | Lewis |
| 7,128,521 B2 | 10/2006 | Hansl |
| 7,771,152 B2 * | 8/2010 | Waltersbacher .............. 414/280 |
| 8,596,952 B2 * | 12/2013 | Wolkerstorfer ............... 414/807 |

(Continued)

FOREIGN PATENT DOCUMENTS

| | | |
|---|---|---|
| DE | 33 00 441 | 9/1984 |
| DE | 40 33 184 A1 | 4/1992 |
| DE | 93 19 511 U1 | 2/1994 |
| DE | 44 22 240 | 1/1995 |
| DE | 94 07 646 | 8/1995 |
| DE | 203 03 376 | 5/2003 |

(Continued)

OTHER PUBLICATIONS

International Search Report.

*Primary Examiner* — James Keenan
(74) *Attorney, Agent, or Firm* — Collard & Roe, P.C.

(57) ABSTRACT

In a method for introducing loading auxiliary structures with a transport device into a shelf compartment with storage spaces arranged one behind the other, a loading auxiliary structure is conveyed by the transport device into the shelf compartment to the front storage space in the direction of introduction, after which a further loading structure is moved by the transport device into the shelf compartment to the front storage space and in this way the preceding loading auxiliary structure is moved to the storage space that is behind and the additional loading auxiliary structure is moved into the front storage space. The transport device includes a removing unit with a stop device adjustable at its front end in the introduction direction into the movement path of the loading auxiliary structure and a drive member on a side facing the loading auxiliary structure.

7 Claims, 15 Drawing Sheets

(56) References Cited

U.S. PATENT DOCUMENTS

| | | |
|---|---|---|
| 2002/0037208 A1* | 3/2002 | Patrito .................... 414/280 |
| 2003/0185656 A1 | 10/2003 | Hansl |
| 2004/0069181 A1 | 4/2004 | Charbonneau et al. |
| 2005/0095095 A1 | 5/2005 | Hansl |
| 2006/0245862 A1 | 11/2006 | Hansl et al. |
| 2006/0285947 A1 | 12/2006 | Hansl et al. |
| 2007/0116544 A1 | 5/2007 | Ragessi |
| 2007/0125727 A1 | 6/2007 | Winkler |

FOREIGN PATENT DOCUMENTS

| | | |
|---|---|---|
| EP | 0 647 575 | 4/1995 |
| EP | 0 733 563 | 9/1996 |
| EP | 0 775 665 | 5/1997 |
| EP | 1 764 317 | 3/2007 |
| EP | 1 772 400 | 4/2007 |
| EP | 1 795 464 | 6/2007 |
| GB | 2 280 178 | 1/1995 |
| JP | 8-290805 | 11/1996 |
| WO | WO 99/30596 | 6/1999 |

* cited by examiner

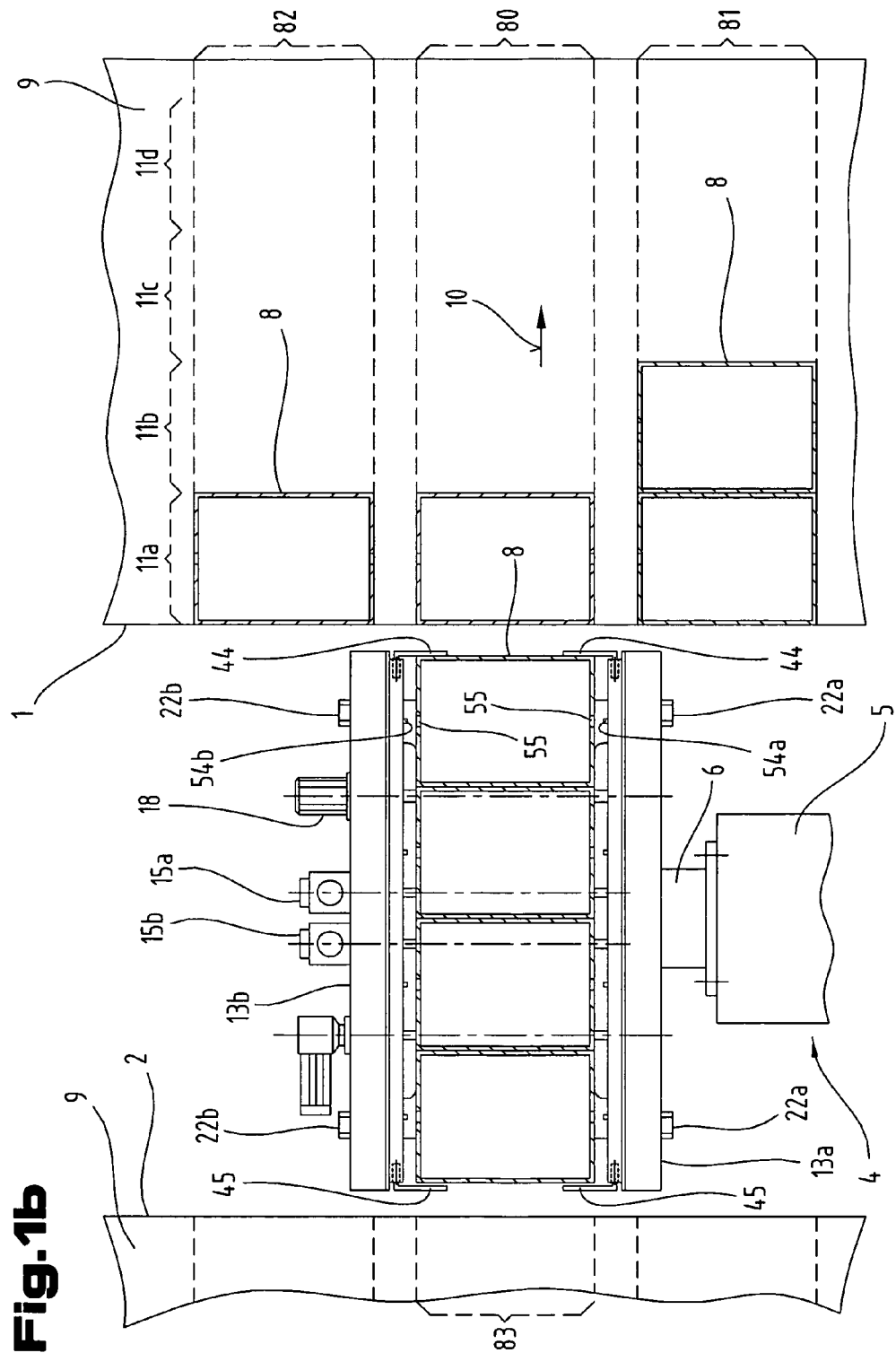

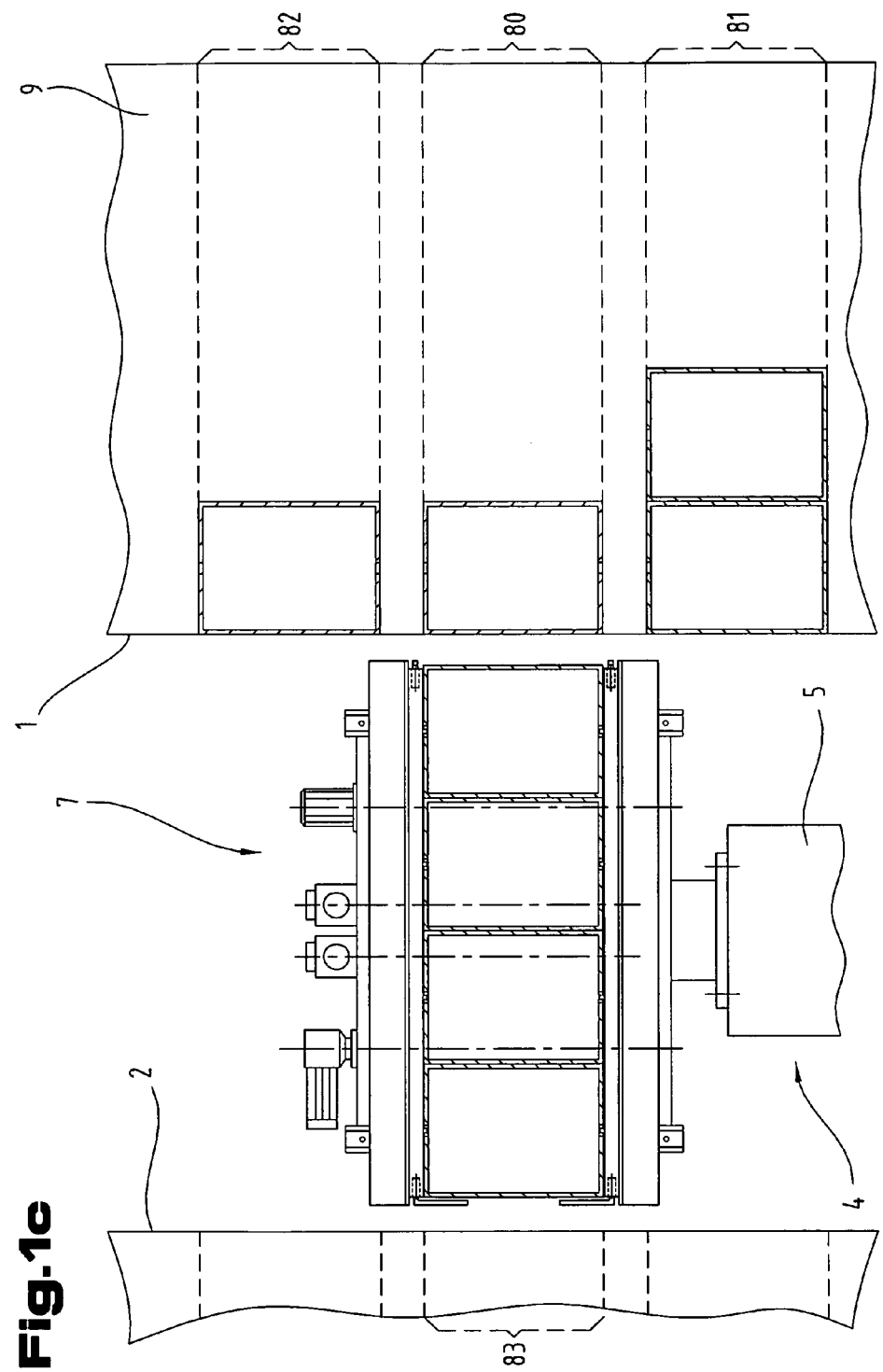

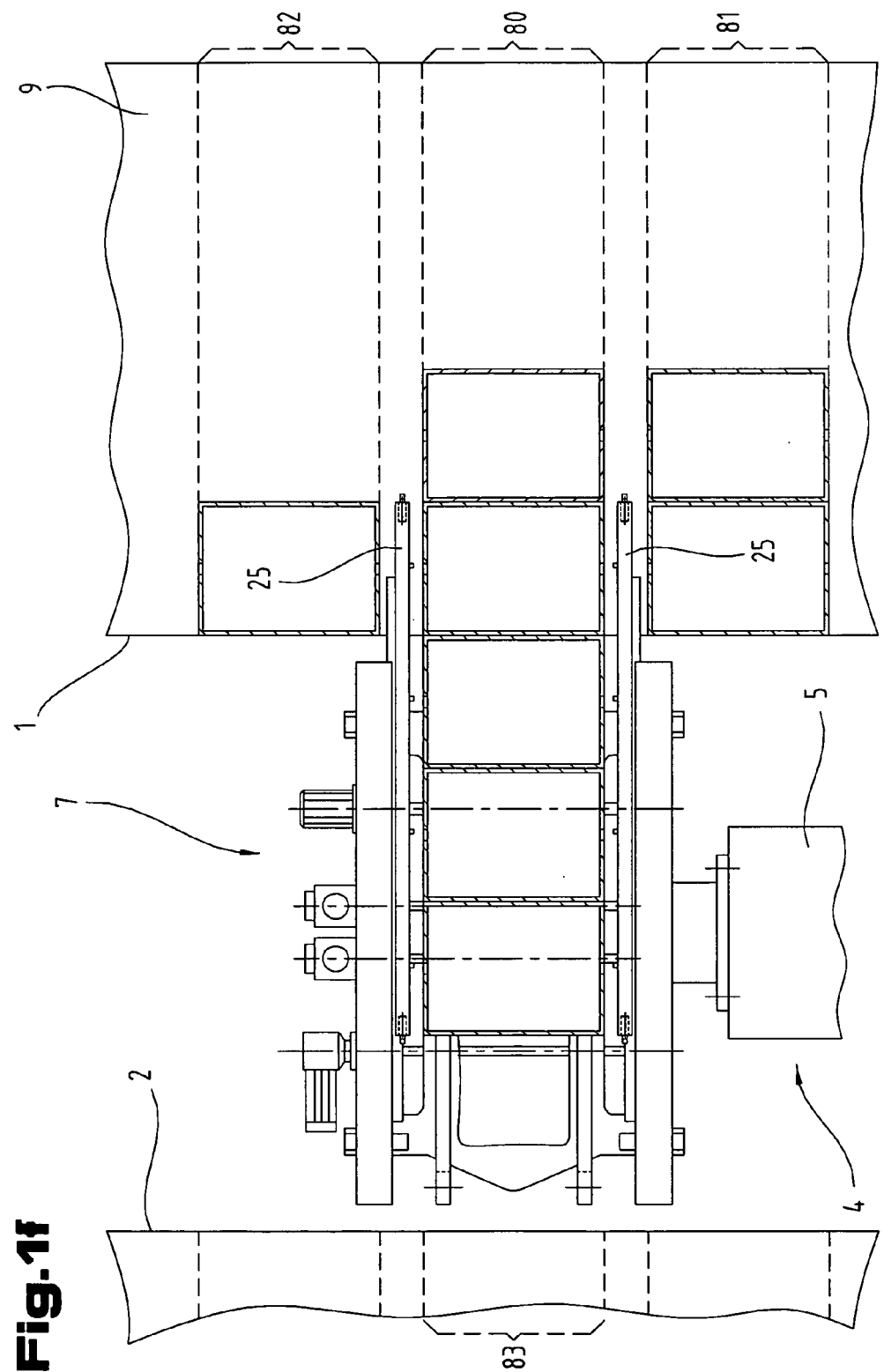

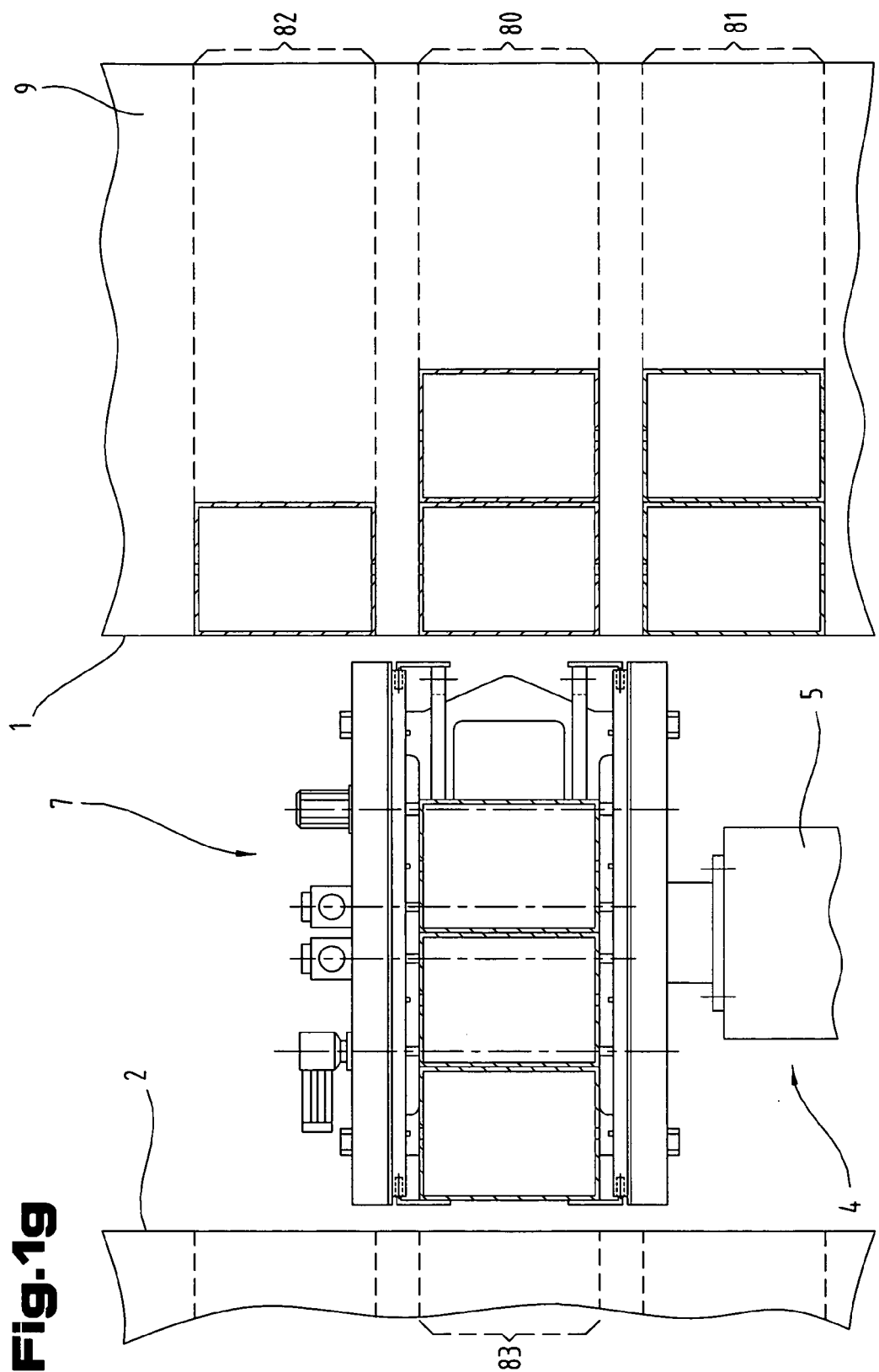

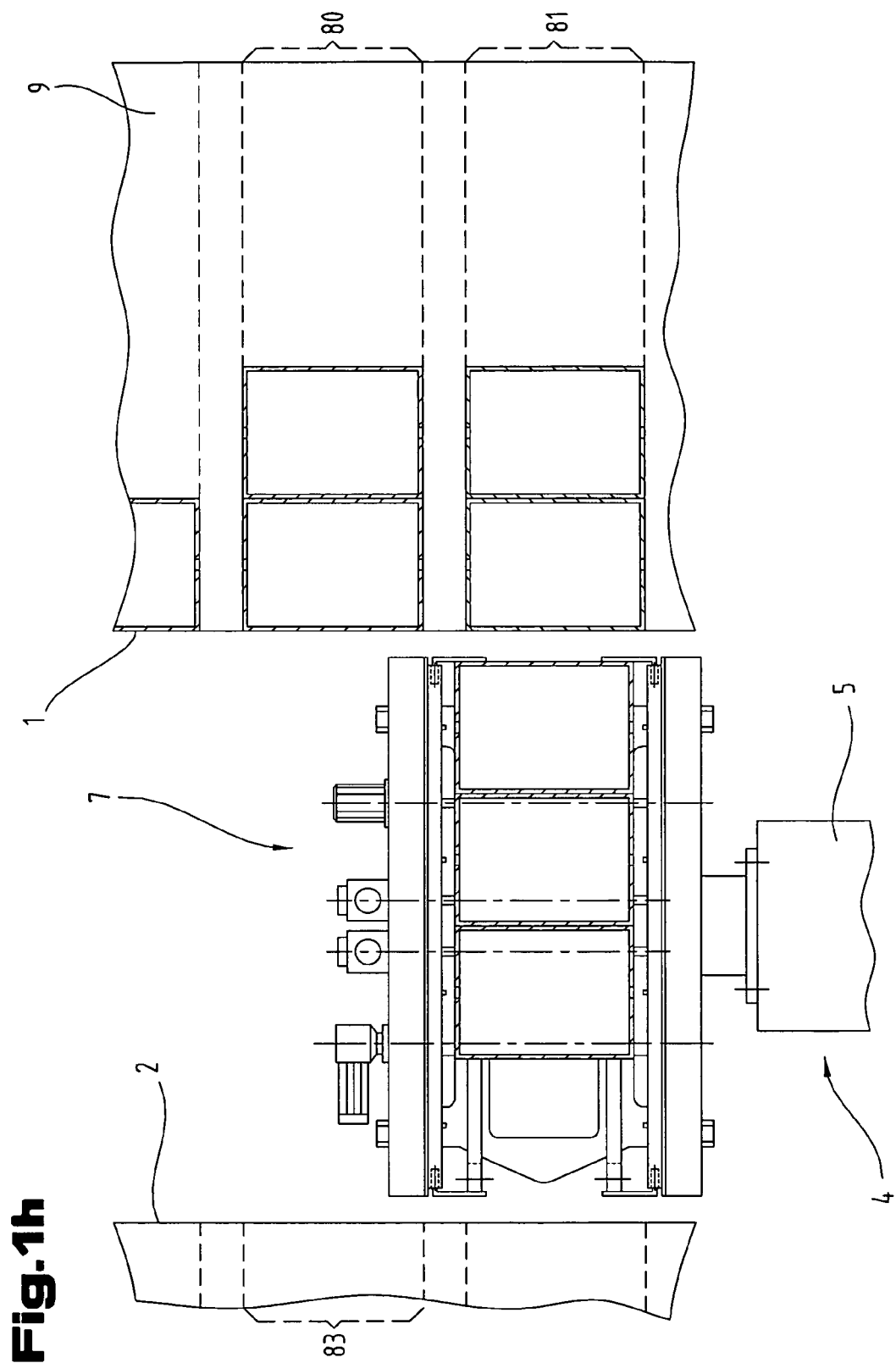

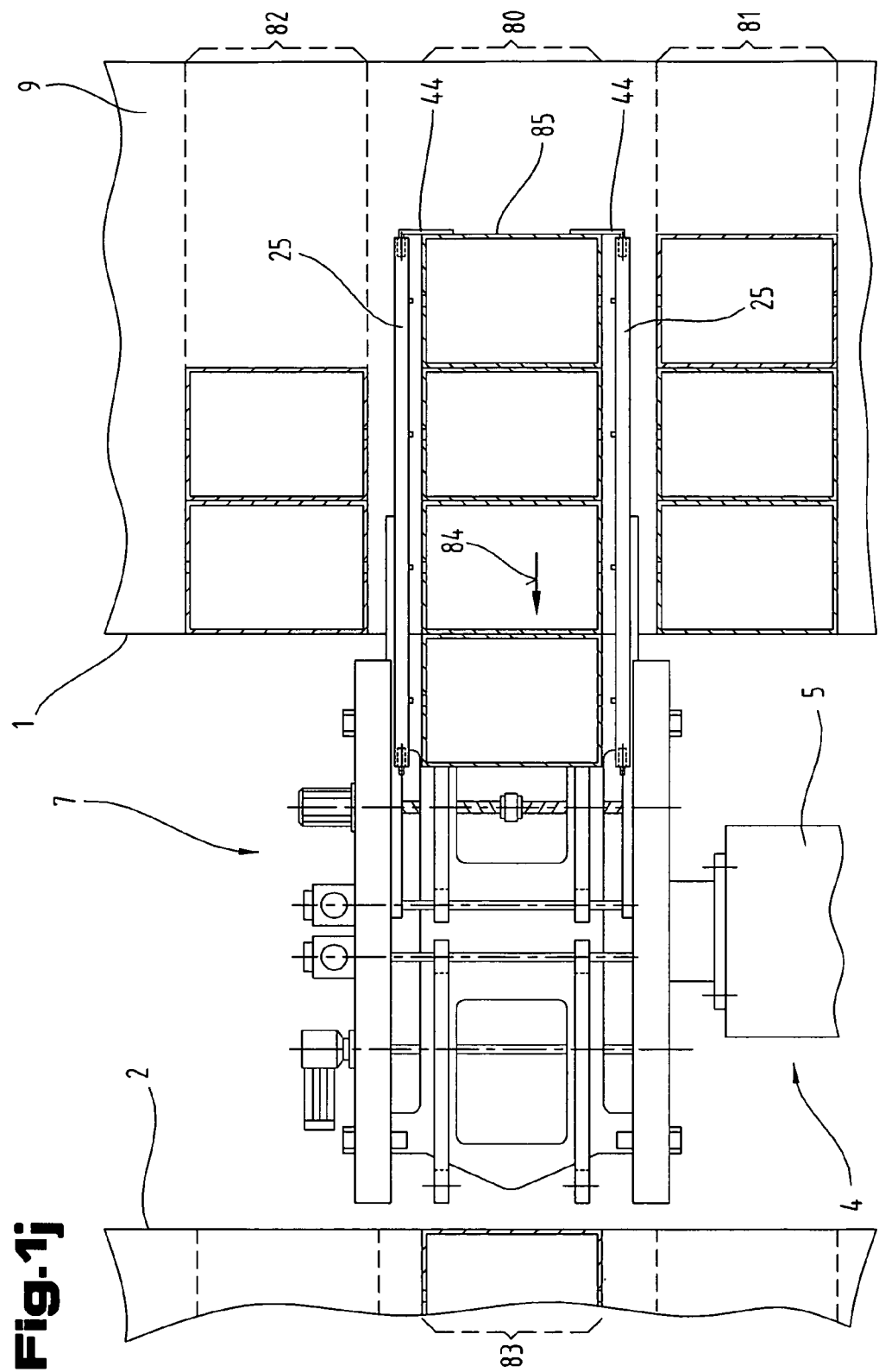

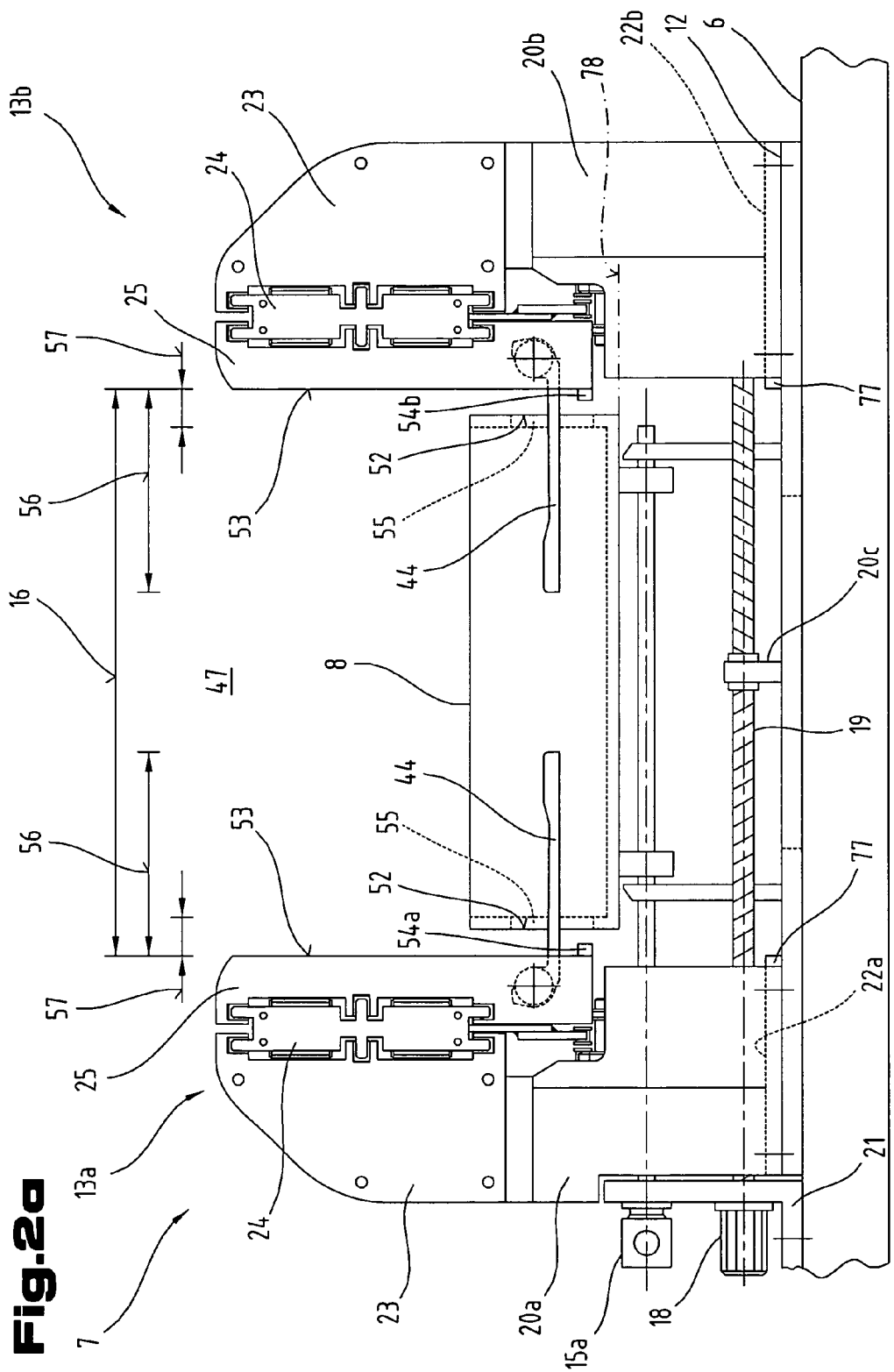

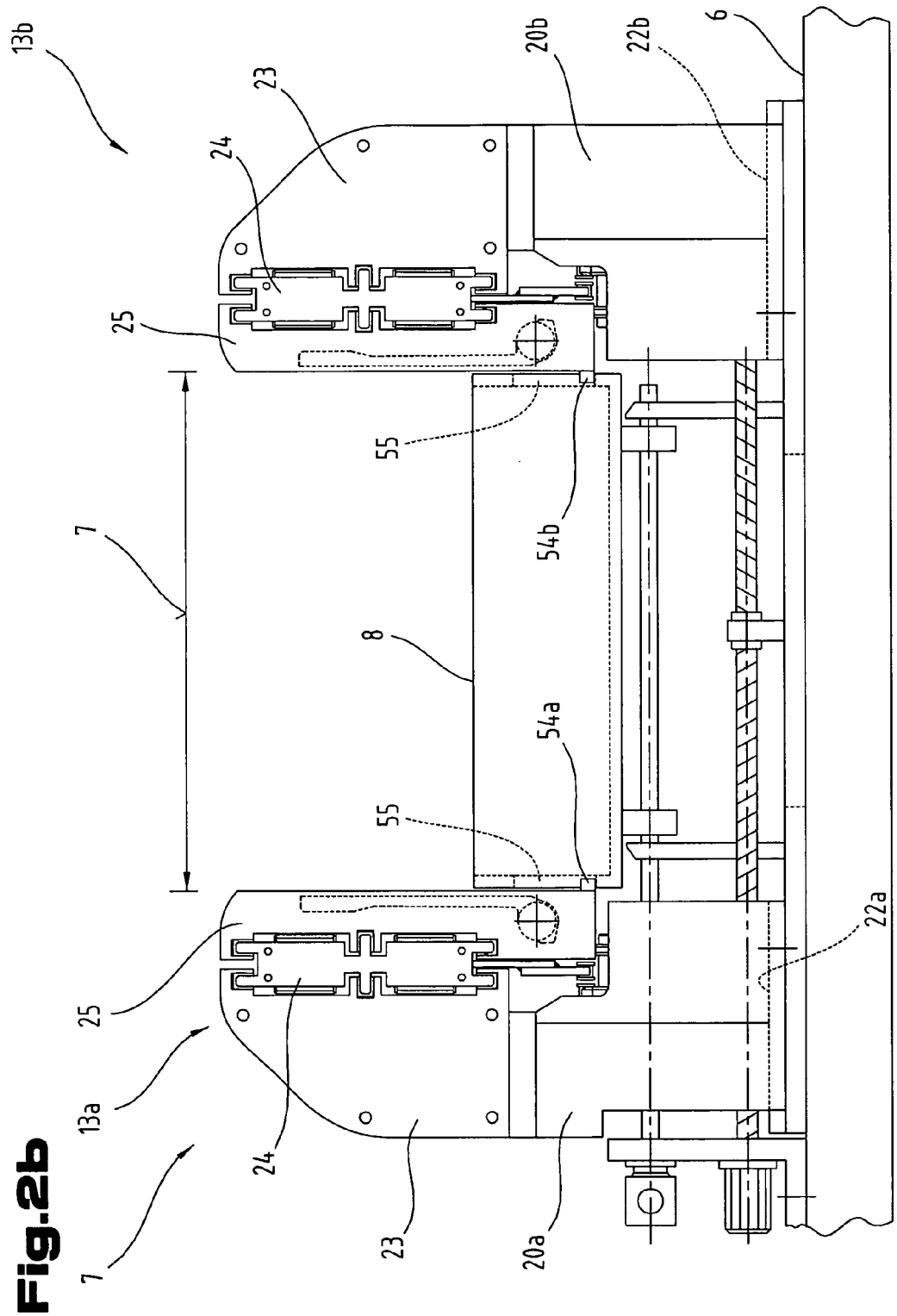

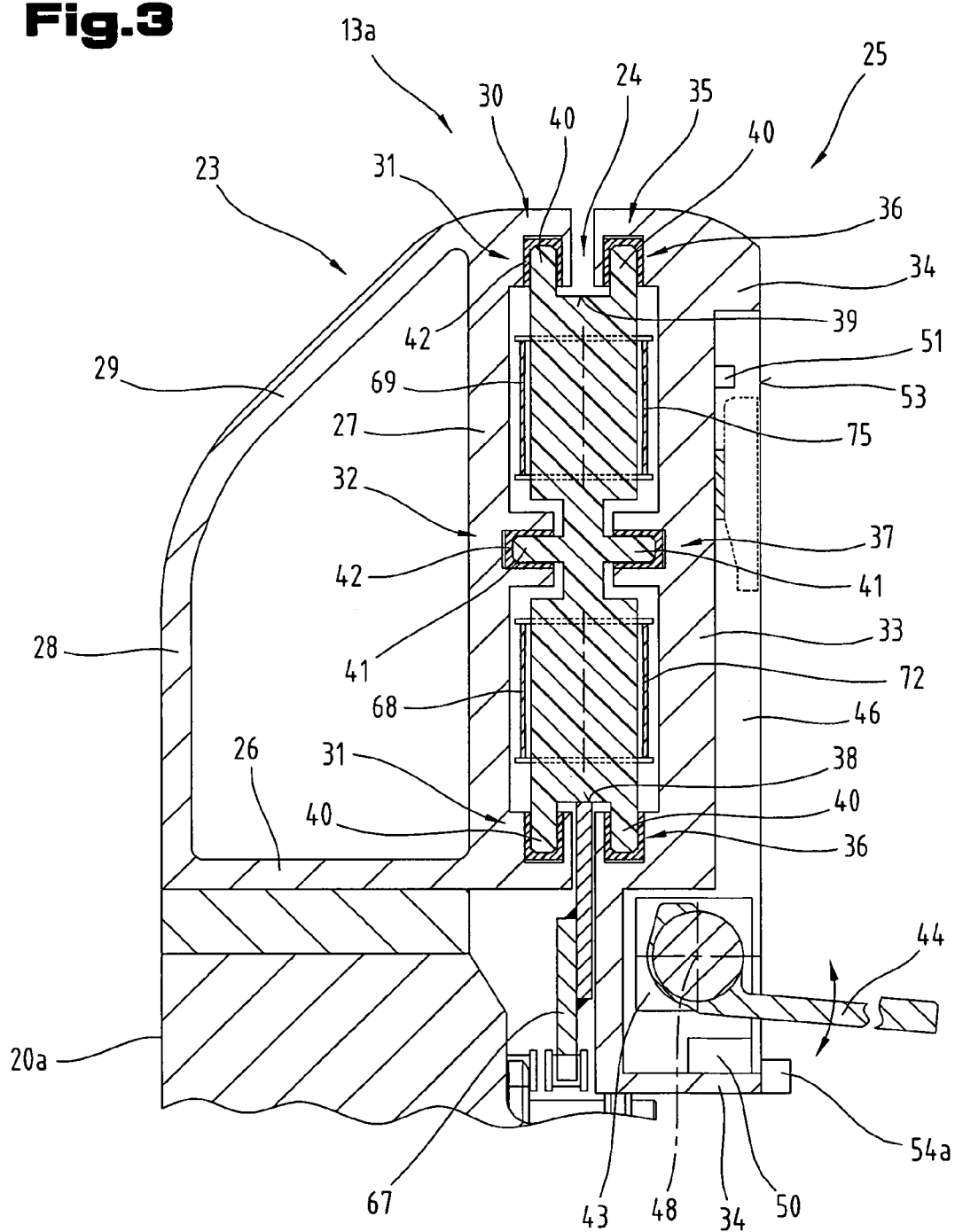

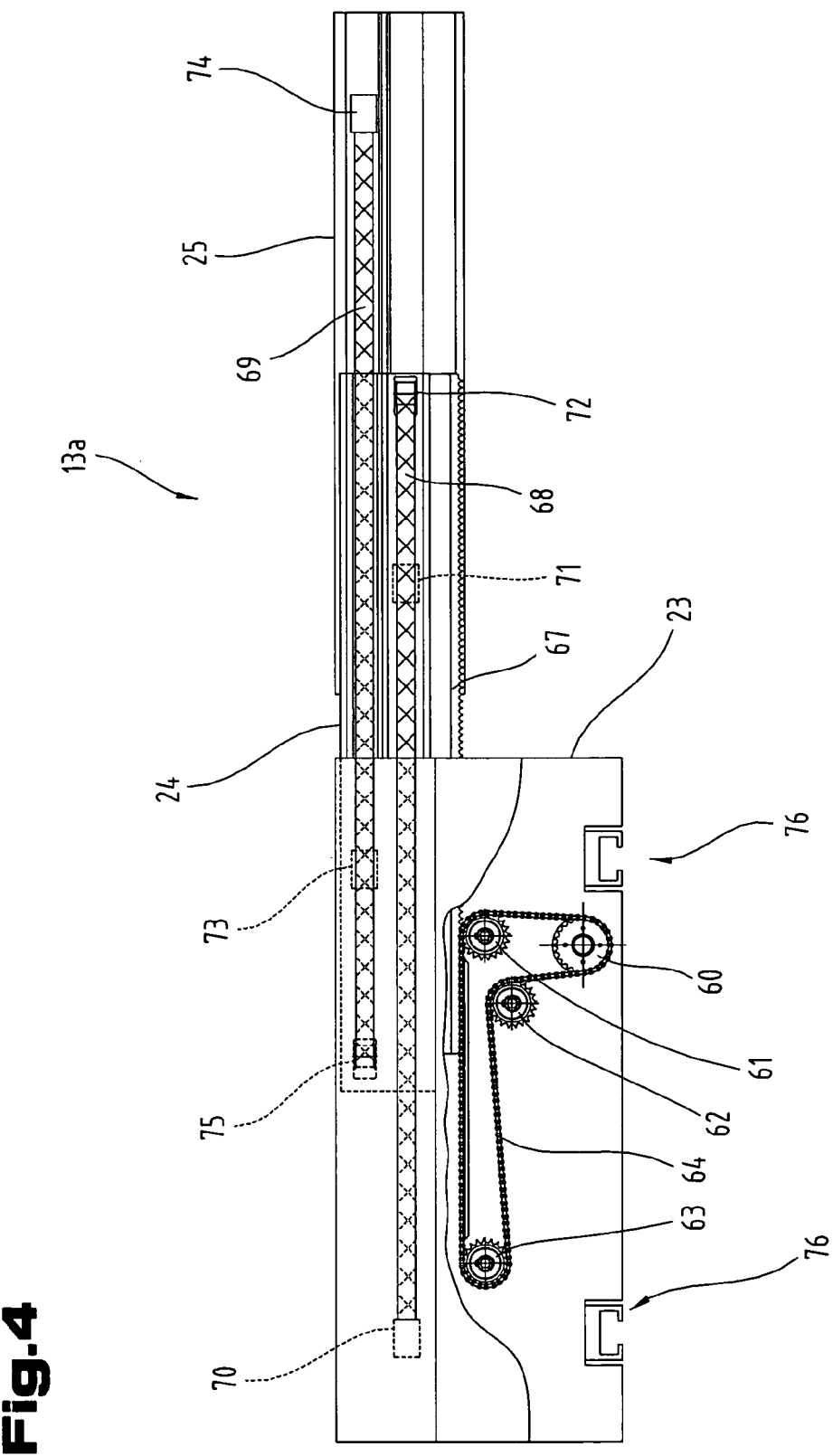

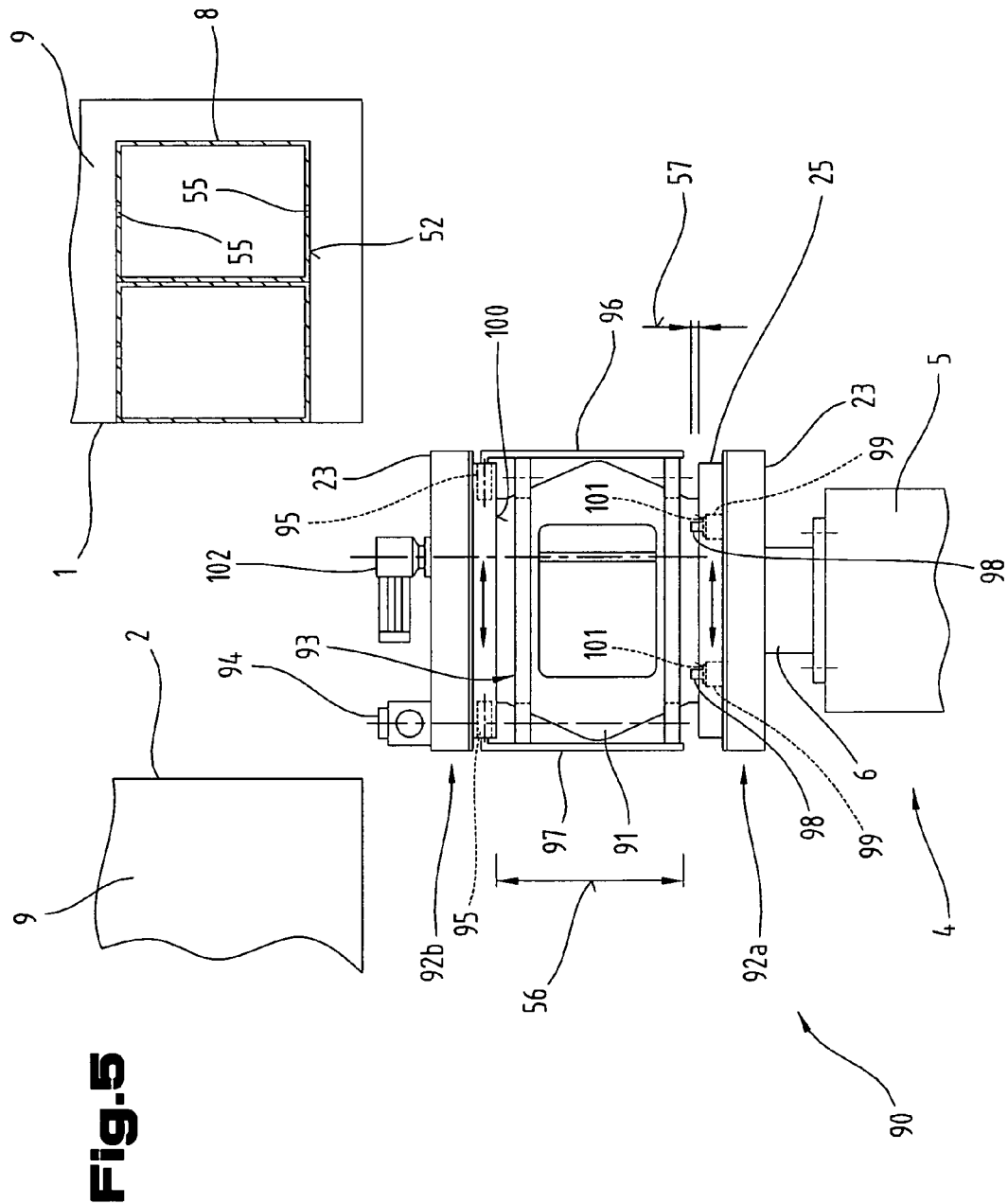

METHOD FOR INTRODUCING LOADING AUXILIARY MEANS OF TRANSPORT DEVICE

CROSS REFERENCE TO RELATED APPLICATIONS

This application is the National Stage of PCT/AT 2008/000467 filed on Dec. 19, 2008, which claims priority under 35 U.S.C §119 Austrian Application No. A 2102/2007 filed on Dec. 21,2007. The international application under PCT article 21 (2 ) was not published in English.

BACKGROUND OF THE INVENTION

1 . Field of the Invention

The invention relates to a method for introducing loading auxiliary means with a transport device into a shelf compartment and a transport device for performing the method, as described in the preambles of claims 1 and 12.

2 . The Prior Art

EP 0 647 575 B1 discloses a transport device for introducing and removing loading auxiliary means into or out of a shelf compartment, which comprises at least one telescopic arm consisting of a support frame and a slide mounted displaceably thereon. The slide is provided at the ends with stop devices that are pivotable between a starting position and an operating position, which stop devices are spaced apart from one another at least so far, that between the latter a loading auxiliary means can be mounted. If a loading auxiliary means is to be introduced into the shelf storage, at least the stop device mounted at the end opposite the shelf system pivots behind the side wall of the loading auxiliary means and the loading auxiliary means is pushed off onto a shelf compartment. During the removal the telescopic arm is extended into the shelf compartment and afterwards the stop device mounted at the end facing the shelf storage pivots behind the side wall of the loading auxiliary means and is pushed off the shelf compartment. The load bearing device is only suitable for operating a shelf storage with a single depth shelf row.

In the transport devices known from U.S. Pat. No. 7,128, 521 B2 and EP 1 772 400 A1 two loading auxiliary means arranged behind one another are gripped from behind individually by stop devices mounted pivotably on telescopic arms and inserted into the shelf store or removed from the shelf storage.

From EP 0 775 665 B1a transport device in the form of a telescopic table is known, in which the outer telescopic slide moves above a loading auxiliary means to be inserted or removed and stop pairs are pivoted in opposite directions respectively behind the respective end of the loading auxiliary means.

The transport device described in DE 203 03 376 U1 for introducing and removing loading auxiliary means comprises a gripping device, which is placed against the side walls of the loading auxiliary means to be inserted or removed in an engaging manner or for example also by means of suction. In this way it is possible to prevent the gripping device from moving up to the rear wall of the shelf compartment during the removal of a loading auxiliary means, in order to grip round the rear side wall of the loading auxiliary means in an engaging manner.

The load mounting device known from DE 44 22 240 A 1 comprises parallel arranged telescopic arms each with a slide that can be extended in horizontal direction on both sides, which are provided with stop devices. The telescopic arms can be moved towards one another in the direction of a shelf aisle (X-direction) and moved apart from one another. On the platform between the telescopic arms a continuous conveyor is arranged. For inserting a palette the latter is firstly pushed so far by the continuous conveyor that the stop devices can engage positively by the advancing movement of the telescopic arms in X-direction into the palette. By removing the slide with the simultaneous drive of the continuous conveyor the palette is moved up to an aisle-close or aisle-remote storage space in a shelf compartment. The gripping of the palette is performed laterally either on the front or middle blocks of the palette. On removing a palette from the shelf compartment firstly the stop devices are adjusted in X-direction and in this way the blocks of the palette are gripped positively from behind by the stop devices and by drawing in the slide the palette is pushed onto the conveying unit.

SUMMARY OF THE INVENTION

The objective of the invention is a method and a transport device for inserting and/or removing loading auxiliary means in shelf systems with several storage spaces arranged behind one another, by means of which the handling performance (number of insertion and/or removal procedures) can be increased within a storage system.

The objective of the invention is achieved by a method described herein, wherein it is an advantage that the feed movement of the transport device for inserting loading auxiliary means into as shelf compartment is particularly short and independently of the storage position of a loading auxiliary means in the shelf compartment the loading means to be inserted is always conveyed to the front storage space and the transport device only has to move out just behind a front edge of the shelf compartment, thereby reducing the transfer time of loading means from a platform into a shelf compartment. In addition, the transport device can be designed to be particularly narrow compared to those known from the prior art and also the shelf can be optimized in a corresponding manner. The narrower the shelf aisle the greater the area of usable shelf available.

A further advantageous feature of the invention leads to the benefit that without having to take additional structural precautions, by means of the loading auxiliary means to be inserted the loading auxiliary means placed in preceding storage cycles in the shelf compartment are moved into deeper positions to the rear.

With a further feature of the invention the benefits are achieved that the loading auxiliary means to be introduced is moved into a defined preparation position and afterwards conveyed to the front storage space in exact alignment.

With a further advantageous measure of the invention the benefits are achieved that by means of the engaging connection between the drive member and loading auxiliary means the latter can be loaded with high acceleration forces and the transfer time for moving a loading auxiliary means from a platform to the front storage space is further reduced.

Whit a further advantageous measure of the invention the benefit is achieved that a reliable engagement and positive connection is ensured between the drive opening on the loading auxiliary means and the drive member.

If the loading auxiliary means are placed closely behind one another, as described the capacity of the shelf system can be better exploited or a larger number of loading auxiliary means can be accommodated in the shelf compartments.

With a further measure according to the invention it is ensured that the loading auxiliary means moved from the front storage space in the direction of the rear storage space reach their exact storage position in the shelf compartment.

Also other measures according to the invention lead to an advantage that the transfer time of the loading auxiliary means from the shelf compartment to the platform or transport device can be reduced considerably and the construction of the transport device is much simplified. Thus it is possible that only a single loading auxiliary means or a group of loading auxiliary means are removed, depending on what is required by an order picking request. The feed force is transferred in the unloading direction from the rear loading auxiliary means to the loading auxiliary means in front.

The objective of the invention is also achieved with the features that lead to an advantage that by means of the different adjustment movements of the stop device and the drive member the functionality of the transport device can be extended on the one hand to introducing loading auxiliary means into a shelf compartment and on the other hand to removing loading auxiliary means from a shelf compartment.

Also another measure according to the invention leads to the advantage that the movement sequences during the insertion and thereby the adjustment of the drive member relative to the loading auxiliary means are repeated more often than the movement sequences of the stop device, which are necessary if the loading auxiliary means have to be removed from the shelf compartment. The shorter movements allow a greater number of insertion processes and contribute to a particularly economical storage system.

Another embodiment has further that lead to the advantage that with relatively narrow shelf aisles several storage places provided behind one another in introduction direction can be operated easily.

Another development according to the invention is advantageous in that a particularly compact structure of the removal unit is proposed and also by means of the drive member high radial forces can be transferred to the loading auxiliary means.

Lastly, another embodiment is advantageous because at least one of the telescopic arms required for the insertion and removal is also equipped with the stop device and can be activated as necessary in order to be able to perform the removal process of the loading auxiliary means from the shelf compartment onto the platform.

BRIEF DESCRIPTION OF THE DRAWINGS

The invention is explained in more detail in the following with reference to the exemplary embodiments shown in the drawings.

FIG. 1a-h show schematically the insertion process of loading auxiliary means from a platform into a shelf compartment, in several consecutive method steps;

FIGS. 1i-j shows schematically the unloading process of loading auxiliary means from the shelf compartment to the platform;

FIG. 2a shows the transport device according to the invention with a removal unit in its opening position in end face view and in a simplified representation;

FIG. 2b shows the transport device according to the invention with the removal unit located in its closed position, in end face view and in a simplified representation;

FIG. 3 shows a telescopic arm of the removal unit in end face view, partly in cross section and in a simplified representation;

FIG. 4 shows the telescopic arm according to FIG. 3 in side view and simplified representation;

FIG. 5 shows a further embodiment of the transport device in plan view and in a much simplified representation.

DETAILED DESCRIPTION OF THE PREFERED EMBODIMENTS

Figure 1A:
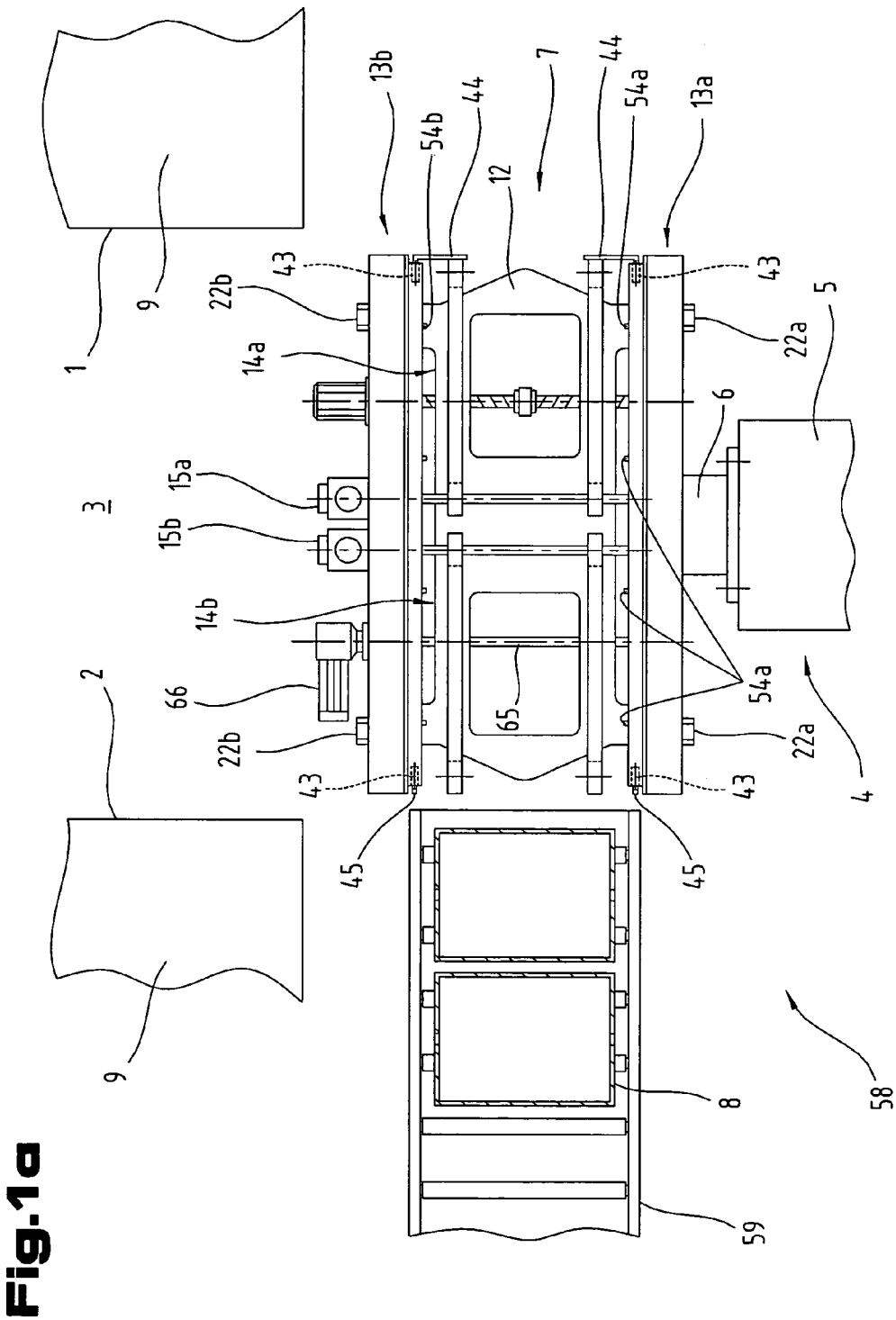

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

In the jointly described FIGS. 1 to 4 a storage system is shown, which comprises shelf systems 1, 2 spaced apart opposite one another in a mirror image configuration. By means of the distance between the shelf systems 1, 2 in the storage system an aisle 3 is kept free in which a conveying unit 4 is arranged. The conveying unit 4 is formed for example by a shelf operating device which moves on rails along the aisle 3 and comprises a perpendicular mast 5 secured onto a drive unit (not shown) and a platform 6 that is vertically adjustable along the latter by means of a lifting drive (not shown) and a transport device 7 arranged on the latter for inserting and/or removing loading auxiliary means 8 into or out of a shelf compartment 9 of the shelf system 1, 2. The loading auxiliary means 8, for example trays, cardboard or plastic containers, are normally filled with goods, but can also be empty.

Each shelf system 1, 2 comprises several shelf compartments 9 arranged spaced apart above one another each with storage spaces 11a to 11d arranged behind one another in several rows in the direction of introduction 10. The shelf compartments 9 form respectively a horizontal fixed bearing surface, of which each bearing surface provides at least one, preferably several storage spaces 11a to 11d arranged behind one another. According to the shown embodiment the shelf systems 1, 2 are designed so that in a shelf compartment 9 in introduction direction 10 four loading auxiliary means 8 with the dimensions 300 mm×400 mm or two loading auxiliary means 8 with the dimensions 600 mm×400 mm can be stored behind one another. The transport device 7 can either mount four loading auxiliary means 8 with the dimensions 300 mm×400 mm in transverse transport or two loading auxiliary means 8 with the dimensions 600 mm×400 mm in longitudinal transport behind one another.

The transport device 7 adjustable between the shelf systems 1, 2 in front of a shelf compartment 9 determined by a computer system comprises a support plate 12, on which a removal unit comprising parallel telescopic arms 13a, 13b and conveying devices 14a, 14b arranged between the latter behind one another in the introduction direction 10 are mounted. The conveying devices 14a, 14b are coupled with independently controllable drive motors 15a, 15b, which are connected in turn to the computer system. Preferably, twin-track conveyors, in particular belt conveyors are used as the conveying devices 14a, 14b. Moreover, the conveying devices 14a, 14b can also be formed by a roller conveyor, belt conveyor and the like.

The telescopic arms 13a, 13b that can extend in both directions relative to the platform 6 into the shelf systems 1, 2 are mounted on the support plate 12 in an adjustable manner by a first control drive between a moved apart opening position 16 shown in FIG. 2a and a moved together closed position 17 shown in FIG. 2b. The first adjusting drive comprises a control motor 18, a spindle 19 coupled to the latter with opposite threaded sections and bearing elements 20a to 20c. The control motor 18 as well as the drive motors 15a, 15b are secured at a securing angle 21 to the platform 6. The bearing elements 20a, 20b are connected respectively by guiding arrangements 22a, 22b to the support plate 12. By rotating the spindle 19 the bearing elements 20a, 20b are moved towards one another or moved apart from one another and in this way the telescopic arms 13a, 13b are adjusted relative to a loading auxiliary means 8 between an open position 16 and closed position 17 at right angles to the introduction direction 10.

FIG. 3 shows a cross section of a telescopic arm 13a. The latter comprises for example a support frame 23 secured for example via a not shown screw connection to the bearing element 20a, a middle slide 24 displaceable relative to the support frame 23 and an upper slide 25 displaceable relative to the middle slide 24.

The support frame 23 is formed for example by a hollow profile and comprises a lower side wall 26 running parallel to the support plate 12, a projecting first and second side wall 27, 28, as well as an upper side wall 29 running at an angle between the projecting side walls 27, 28. Between the middle slide 24 and the support frame 23 a guiding arrangement 30 is provided, which is formed according to the shown exemplary embodiment by a sliding guide. The support frame 23 is provided in addition on the projecting first side wall 27 facing the middle slide 24 in the region of the longitudinal edges with side guiding tracks 31 and between the latter with a vertical guiding track 32.

The upper slide 25 is designed to be approximately C-shaped in cross section and comprises a base 33 and arms 34 projecting on the latter on the side facing away from the middle slide 24. Between the upper slide 25 and the middle slide 24 a guiding arrangement 35 is provided. The upper slide 25 is provided for this on the projecting base 33 facing the middle slide 24 in the region of the longitudinal edges with side guiding tracks 36 and between the latter with a vertical guiding track 37.

The plate-like middle slide 24 is provided on the one hand on its lower side 38 and upper side 39 respectively with rib-like guiding webs 40 running parallel in longitudinal extension and complementary to the side guiding tracks 31, 36 of the support frame 23 and upper slide 25, and on the other hand on its side walls between the lower side and under side 38, 39 with rib-like guiding webs 41 running in longitudinal extension and designed to be complementary to the vertical guiding tracks 32, 27 of the support frame 23 and the upper slide 25. Sliding strips 42 are fitted onto the guiding webs 40, 41 of the middle slide 24.

Of course, instead of the shown sliding guides between the support frame 23 and middle slide 24 on the one hand and upper slide 25 and middle slide 24 on the other hand a roller guide and the like can be provided.

The upper slide 25 of each telescopic arm 13a, 13b is provided at its opposite ends respectively with stop devices 44, 45 adjustable by means of a fluid or electrically operated control motor 43 between a starting position shown in FIG. 2b and an operating position shown in FIG. 2a. In the starting position the stop device 44, 45 is moved into a recess 46 between the arms 34 of the upper slide 25, therefore the stop device 44, 45 is moved out of a movement path 47 of the loading auxiliary means 8 between the conveying unit 4 and the shelf compartment 9. However, in the operating position the stop device 44, 45 is moved out of the recess 46, therefore the stop device 44, 45 is moved in the movement path 47 of the loading auxiliary means 8 between the conveying unit 4 and the shelf compartment 9 and projects beyond the outer delimitation of the upper slide 25.

According to the shown exemplary embodiment the stop devices 44, 45 are formed by flaps mounted on the upper slide 25 to be pivotable about axes 48 parallel to the introduction direction 10 between the starting and operating position.

The stop devices 44, 45 of the two upper slides 25 are arranged opposite one another and can be adjusted synchronously in the direction of the opposite stop device 44, 45.

As shown in FIG. 3 the starting and operating position of the stop device 44, 45 is monitored by sensors 50, 51.

The transport device 7 or removal unit also comprises an alignment device for loading auxiliary means 8 provided on the conveying device 14a, 14b, which according to this exemplary embodiment is formed by the telescopic arms 13a, 13b which can moved in opposite directions into a closing position 17 and comprises planar alignment surfaces 53 which are adjustable relative to one another in an alignment or centring position and can be placed against the parallel side walls 52 in introduction direction. Preferably, the opposite alignment surfaces 53 are moved towards one another into the alignment position, so that a loading auxiliary means 8 is positioned on the conveying device 14a, 14b centrally between the telescopic arms 13a, 13b, before it is offloaded into the shelf compartment 9. However, only one of the telescopic arms 13a, 13b can be adjusted in the direction of the opposite fixed telescopic arm 13a, 13b.

The transport device 7 or removal unit also comprises between the stop devices 44, 45 at least one knob-like drive member 54, which is mounted to be relatively adjustable on the support plate 12 by a control adjusting drive between a base position shown in FIG. 2a and a conveying position shown in FIG. 2b.

As shown in the Figures both telescopic arms 13a, 13b are provided on their upper slides 25 respectively between the end mounted stop devices 44, 45 with several drive members 54a, 54b arranged spaced apart behind one another in introduction direction 10 and projecting perpendicularly on the alignment surface 53, whereby the drive members 54a, 54b of the two upper slides 25 lie opposite one another and are adjustable respectively in the direction of the opposite drive member 54a, 54b. The spacing between the front drive member 54a, 54b in introduction direction 10 and the stop device 44, 45 in the case of the loading auxiliary means 8 with the dimensions 300 mm×400 mm is between 25% and 75%, in particular 50% of their length in introduction direction 10 and with loading auxiliary means 8 with the dimensions 600 mm×400 mm is between 10% and 50%, in particular 25% of their length in introduction direction 10.

If loading auxiliary means 8 are introduced with the dimensions 300 mm×400 mm, in the conveying position at least one pair of knob-like drive members 54a, 54b engage positively in drive openings 55 in the side walls 52 of the loading auxiliary means 8, as shown in FIGS. 1c and 2b. The drive opening 55 can for example be delimited by ribs provided on the side wall 52 or can be formed by a groove, bore or the like recessed in the side wall 52.

If loading auxiliary means 8 with the dimensions 600 mm×400 mm are introduced in the conveying position two pairs of drive members 54a, 54b engage in drive openings 55 into the side walls 52 of the loading auxiliary means 8 in a positive manner (not shown).

The adjustment path 56 of the stop device 44, 45 is greater than the adjustment path 57 of the drive member 54a, 54b, whereby the adjustment path 56 of the stop device 44, 45 is determined so that the stop device 44, 45 in the operating position is adjusted beyond the side wall 52 and/or behind the loading auxiliary means 8. The adjustment path 56 of the stop device 44, 45 is between 50 mm and 200 mm and the adjustment path 57 of the drive member 54*a*, 54*b* is between 5 mm and 30 mm.

The telescopic arms 13*a*, 13*b* can be extended telescopically by a second control drive in relation to the platform 6 in both directions, as explained with reference to FIGS. 3 and 4.

On the support frame 23 of the telescopic arms 13*a*, 13*b* a tensioning means drive is arranged which comprises a drive wheel 60, guiding wheels 61, 62, a tensioning wheel 63 as well as a continuous tensioning means 64 guided about the latter, for example a chain. The drive wheels 60 are connected together via a drive shaft 65 (FIG. 1*a*) and coupled to a drive motor 66.

Onto the middle slides 24 respectively a drive member 67, for example a rack is secured, which engages with the upper strand of the tensioning means 64. In this way upon a rotation of the drive wheels 60 the middle slides 24 can be loaded by the tensioning means 64 and drive members 67 by a driving force and displaced synchronously relative to the support frame 23, i.e. moved in or out.

In order to displace the upper slides 25 relative to the middle slide 24 at the same time, the upper slides 25 are connected respectively by means of two tensioning means 68, 69, in particular straps, to the support frame 23.

The first tensioning means 68 is secured at its first end by means of a clamping device 70 to the opposite end section of the support frame 23 in the extension direction of the telescopic arm 13*a*, 13*b* and is secured at its second end by means of a clamping device 71 to the opposite end section in the extension direction of the telescopic arm 13*a*, 13*b* and guided about a roller 72 mounted in the extension direction of the telescopic arm 13*a*, 13*b* in the front end section of the middle slide 24.

The second pulling means 69 is secured at its first ends by means of a clamping device 73 on the front end section in extending direction of the telescopic arm 13*a*, 13*b* of the support frame 23 and with its second ends is secured by means of a clamping device 74 to the front end section of the upper slide 25 in the drawing out direction of the telescopic arm 13*a*, 13*b* and pivoted about a roller 75 mounted in the extending direction of the telescopic arm 13*a*, 13*b* in the opposite end section of the middle slide 24.

Depending on the rotational direction of the drive motor 66 the telescopic arms 13*a*, 13*b* can now be retracted and extended synchronously, in order to introduce loading auxiliary means 8 into a shelf compartment 9 of the shelf system 1 set up on the right side of the aisle 3 or of the shelf system 2 set up on the left side of the aisle 3 or to remove them from a shelf compartment 9 of the shelf system 1 set up on the right side of the aisle 3 or from a shelf system 2 set up on the left side of the aisle 3.

As shown in FIG. 4 the support frame 23 is provided with guiding elements 76 which are designed to be complementary to the guiding elements 77 secured onto the support frame 6 (FIGS. 2*a*, 2*b*).

In the following with reference to FIGS. 1*a* to 1*h* the method is described for introducing loading auxiliary means 8 with the transport device 7 into a shelf compartment 9 of the shelf systems 1, 2.

The logistics flow is controlled centrally by a computer system, in which picking orders are detected electronically and processed one after the other. A picking order can include one or more articles. If several articles are required the latter are packed individually or as a group of articles onto loading auxiliary means 8. The loading auxiliary means 8 assigned to a picking order can have the same or different dimensions, as described above and are introduced into storage channels 80 to 83 etc. of the storage compartments 9 relating to the order defined in the computer system. In the Figures the storage channels 80 to 83 etc. are indicated by dashed outlines.

During the processing of picking orders it is possible that loading auxiliary means 8 are loaded onto the transport device 7, which are assigned to different picking orders. It may then be necessary for a first loading auxiliary means 8 to be introduced into storage channel 80, a second loading auxiliary means 8 into storage channel 81, a third loading auxiliary means 8 into storage channel 82 and a fourth loading auxiliary means 8 into storage channel 83.

In the following the process of introducing a loading auxiliary means 8 into storage channel 80 is described.

Before the transport device 7 is moved into the storage position defined by the computer system in front of the storage channel 80, in a prezone 58 shown in FIG. 1*a* of the storage system according to the picking orders by at least one conveying device 59 loading auxiliary means 8 are transported one after the other and taken over by the transport device 7. The conveying device 59 is formed for example by a roller conveyor. The loading auxiliary means 8 are provided on one of their side walls with a data carrier, in particular a barcode label, RFID-label or a transponder, which contains machine-readable data, which before the transfer of the loading auxiliary means 8 onto the transport device 7 is picked up by a reader (not shown) and communicated to the computer system.

The computer system thus picks up the allocation of the loading auxiliary means 8 to the respective picking order and the sequence in which the loading auxiliary means 8 are trans-ferred to the transport device 7. In other words the computer system always knows where which loading auxiliary means 8—assigned to a picking order—is located on the transport device 7.

Prior to the movement of the loading auxiliary means 8—therefore of two loading auxiliary means 8 with the dimensions 600 mm×400 mm or four loading auxiliary means 8 with the dimensions 300 mm×400 mm—from the conveying device 59 onto the transport device 7 it has to be ensured that the pair of stop devices 44, 45 facing the conveying device 59 are moved into the starting position and the telescopic arms 13*a*, 13*b* are moved into their opening position 16. The conveying device 59 of the prezone 58 and the conveying devices 14*a*, 14*b* of the transport device 7 are driven for moving the loading auxiliary means 8 to the transport device 7 at the same conveying speed. The pair of stop devices 44, 45 opposite the takeover side of the loading auxiliary means 8 is shifted into the operating position, thus into the movement path 47 of the loading auxiliary means 8, as shown in FIG. 1*a*.

The loading auxiliary means 8 are then conveyed on the transport device 7 by means of the conveying devices 14*a*, 14*b* along movement path 47 and the first loading auxiliary means 8 taken over by the transport device 7 and moved into the storage channel 80 is positioned against the stop devices 44 arranged on the introduction side, whereas the following loading auxiliary means 8 runs against the first loading auxiliary means 8. If four loading auxiliary means 8 are to be inserted, the first loading auxiliary means 8 is positioned against the stop devices 44 arranged on the introduction side and the following loading auxiliary means 8 is stored behind the first loading auxiliary means 8.

If the auxiliary means 8 are placed on the transport device 7, the transport device 7 is moved by means of the conveying unit 4 out of the prezone 58 into the storage position determined by the computer system in front of the storage channel 80. Once the storage position has been reached the transport device 7 is moved so far that its conveying plane 78 formed by the conveying devices 14*a*, 14*b*—as indicated in FIG. 2*a*—and the horizontal bearing surface of the shelf compartment 9 are in alignment and the transport device 7 is positioned centrally to the rear storage spaces 11*a* to 11*d* of the storage channel 80. Preferably, during the movement of the transport device 7 both the stop devices 44 at the right end of the upper slides 25 and the stop devices 45 at the left end of the upper slide 25 are moved into their operating position, as indicated in FIG. 1*b*. In this way an unwanted displacement of the loading auxiliary means 8 on the transport device 7 during the driving movement of the drive unit 4 is limited and errors in the storage system are avoided The loading auxiliary means 8 are positioned on the transport device 7 prior to their insertion into the storage channel 80 of the shelf compartment 9 against the front stop devices 44 in introduction direction 10, which were already moved into their operating position shown in FIG. 1*b*, in which the conveying devices 14*a*, 14*b* transmit a driving force to the loading auxiliary means 8. If the first loading auxiliary means 8 in introduction direction 10 reaches the stop devices 44, by means of a not shown sensor, for example a light barrier, the presence of said loading auxiliary means 8 is detected and the first and/or second conveying device 14*a*, 14*b* is driven and stopped by the computer system.

The loading auxiliary means 8 are now positioned on the transport device 7 so that the drive members 54*a*, 54*b* opposite one another in pairs are opposite one another centrally to the drive openings 55 arranged in the side walls 52 of each loading auxiliary means 8. Then the telescopic arms 13*a*, 13*b* are moved out of their opening position 16 into their closing position 17 and the drive members 54*a*, 54*b* are moved out of their basic position into their conveying position relative to the loading auxiliary means 8 and in this way the loading auxiliary means 8 are gripped positively, as shown in FIG. 1*c*. Once the loading auxiliary means 8 are gripped positively the front stop devices 44 in the direction of introduction 10 are moved back from their operating position into their starting position.

Figure 1D:
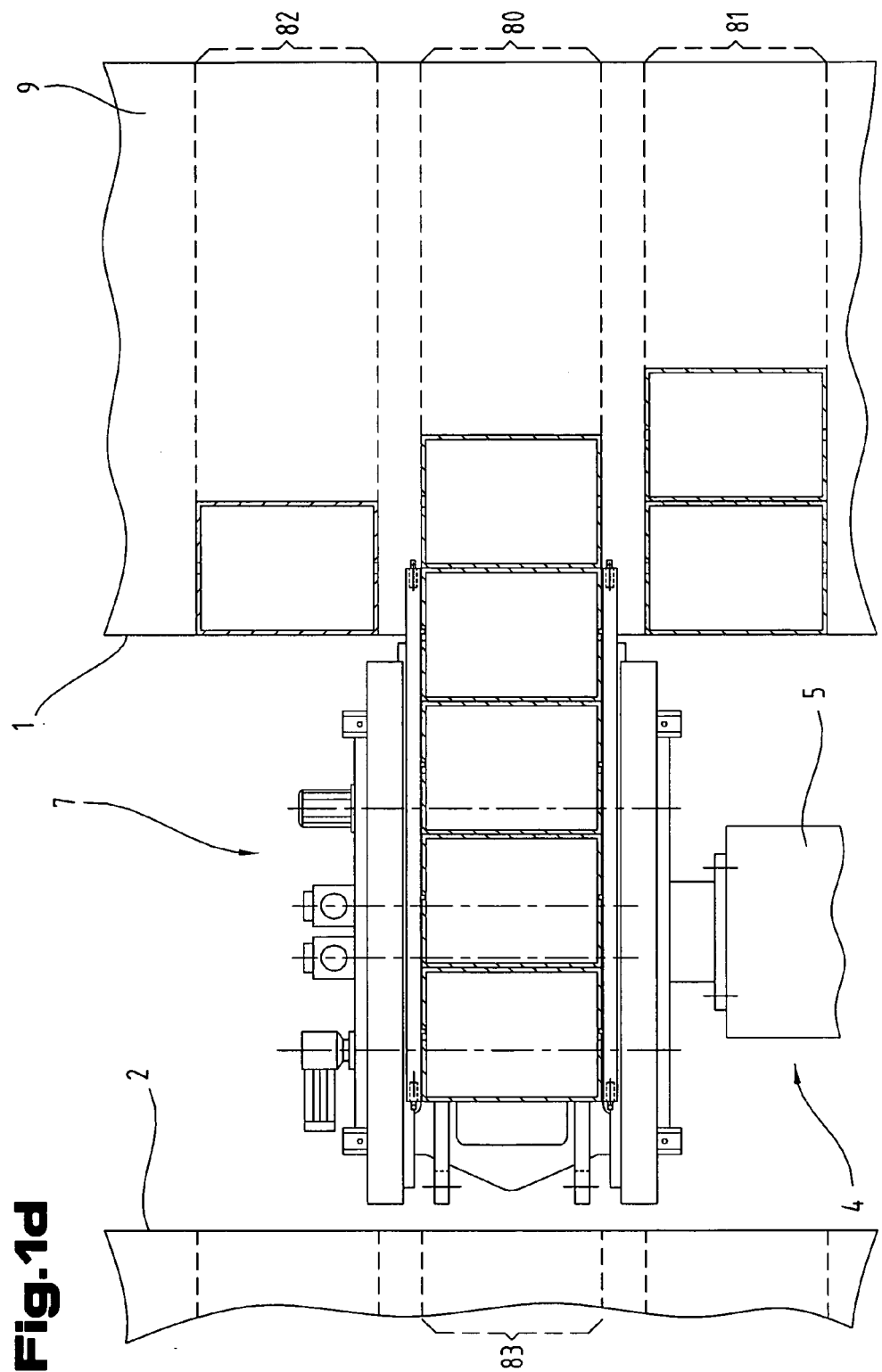

After this the telescopic arms 13*a*, 13*b* are extended synchronously and the loading auxiliary means 8 are moved in the direction of the storage channel 80, as shown in FIG. 1*d*. The storage channel 80 comprises according to this embodiment four storage spaces 11*a* to 11*d*. At the same time also the conveying devices 14*a*, 14*b* are driven in the direction of insertion 10.

Figure 1E:
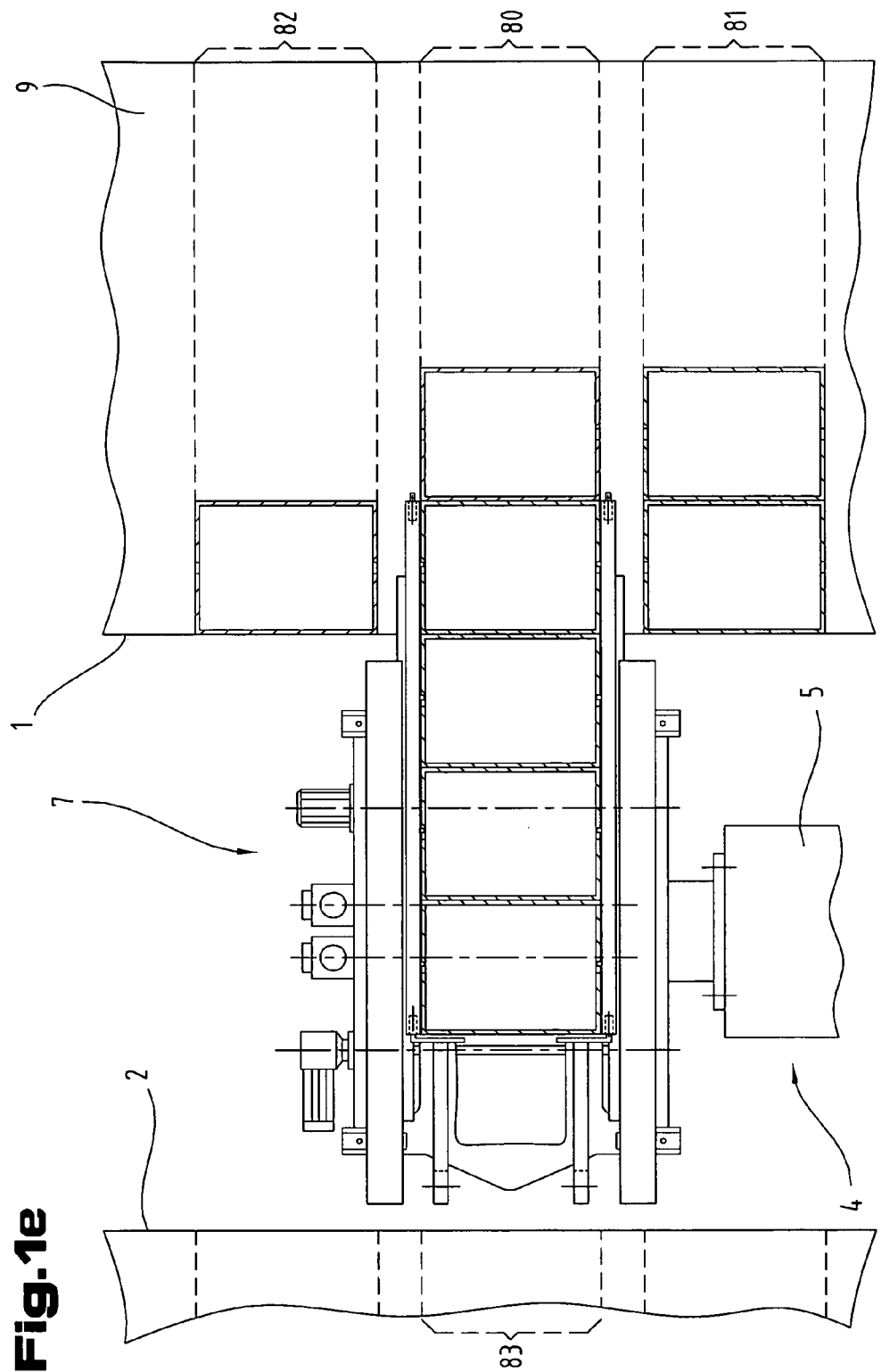

The conveying speed of the conveying devices 14*a*, 14*b* corresponds to the extension speed of the telescopic arms 13*a*, 13*b*. The first loading auxiliary means 8, which is in engagement with the driving members 54*a*, 54*b*, is displaced only by the extension movement of the telescopic arms 13*a*, 13*b* up to the first storage space 11*a* in the direction of insertion 10, where a loading auxiliary means 8 has already been placed for the same picking order. The loading auxiliary means 8 placed in a preceding cycle at the first storage space 11*a* is pushed by means of the first loading auxiliary means 8 to be introduced to the second storage space 11*a* behind the latter, as shown in FIG. 1*e*.

After this the telescopic arms 13*a*, 13*b* are moved from their closing position 17 into the opening position 16 and the drive members 54*a*, 54*b* are moved from their conveying position into their basic position relative to the loading auxiliary means 8, so that the loading auxiliaiy means 8 are released and the telescopic arms 13*a*, 13*b* can retract again, as shown in FIG. 1*f*.

At the same time as the retraction of the telescopic arms 13*a*, 13*b* the conveying devices 14*a*, 14*b* are driven opposite the introduction direction 10. The conveying speed of the conveying devices 14*a*, 14*b* corresponds to the retraction speed of the telescopic arms 13*a*, 13*b*. In this way the remaining three loading auxiliary means 8 on the transport device 7 are moved in the direction of the left stop devices 45 and positioned on the latter. If the fourth loading auxiliary means 8 in the direction of insertion 10 runs against the stop devices 45, the presence of said loading auxiliary means 8 is detected by means of a not shown sensor, for example a light barrier, and the first and/or second conveying device 14*a*, 14*b* is driven and stopped by the computer system. Then the right stop devices 44 are moved out of their starting position into the operating position, as shown in FIG. 1*g*.

The storage cycles are repeated until the storage channel 80 contains all of the loading auxiliary means 8 required for a picking order.

FIG. 1*h* also shows a storage cycle in which the second loading auxiliary means 8 placed on the transport device 7 is to be introduced into the storage channel 81.

In the storage channel 81 loading auxiliary means 8 from at least one preceding storage cycle are placed in the first and second storage space 11*a*, 11*b*. In said storage cycle the second loading auxiliary means 8 is pushed from the transport device 7 in the manner described above onto the first storage space 11*a* and in this way the loading auxiliary means 8 placed in the first and second storage space 11*a*, 11*b* are pushed into the second and third storage spaces 11*b*, 11*c* behind them.

The described operation is repeated until the third and fourth loading auxiliary means 8 have been placed in the corresponding storage channels 82, 83 and the conveying unit 4 moves back into the prezone 58 for accepting loading auxiliary means 8 for further picking orders.

It should also be mentioned that it is also possible in a storage cycle to push several loading auxiliary means 8 at the same time as a group from the transport device 7 into a storage channel. For example, the first and second loading auxiliary means 8 can be pushed into the storage channel 80 up to the first and second storage space 11*a*, 11*b*. In this case the loading auxiliary means 8 placed in a preceding storage cycle in the first storage space 11*a* is pushed into the third storage space 11*c*.

Moreover, loading auxiliary means 8 with varying dimensions can be placed in one storage channel. Thus loading auxiliary means 8 with the dimensions 600 mm×400 mm can be placed in the first and second storage space 11*a*, 11*b* and loading auxiliary means 8 with the dimensions 300 mm×400 mm can be placed in the third and fourth storage space 11*c*, 11*d*.

If the loading auxiliary means 8 required for a picking order have been put together in a storage channel 80, the loading auxiliary means 8 can be removed by the transport device 7 and for example conveyed to the unloading conveying device (not shown) or loading station or the like.

Figure 1I:
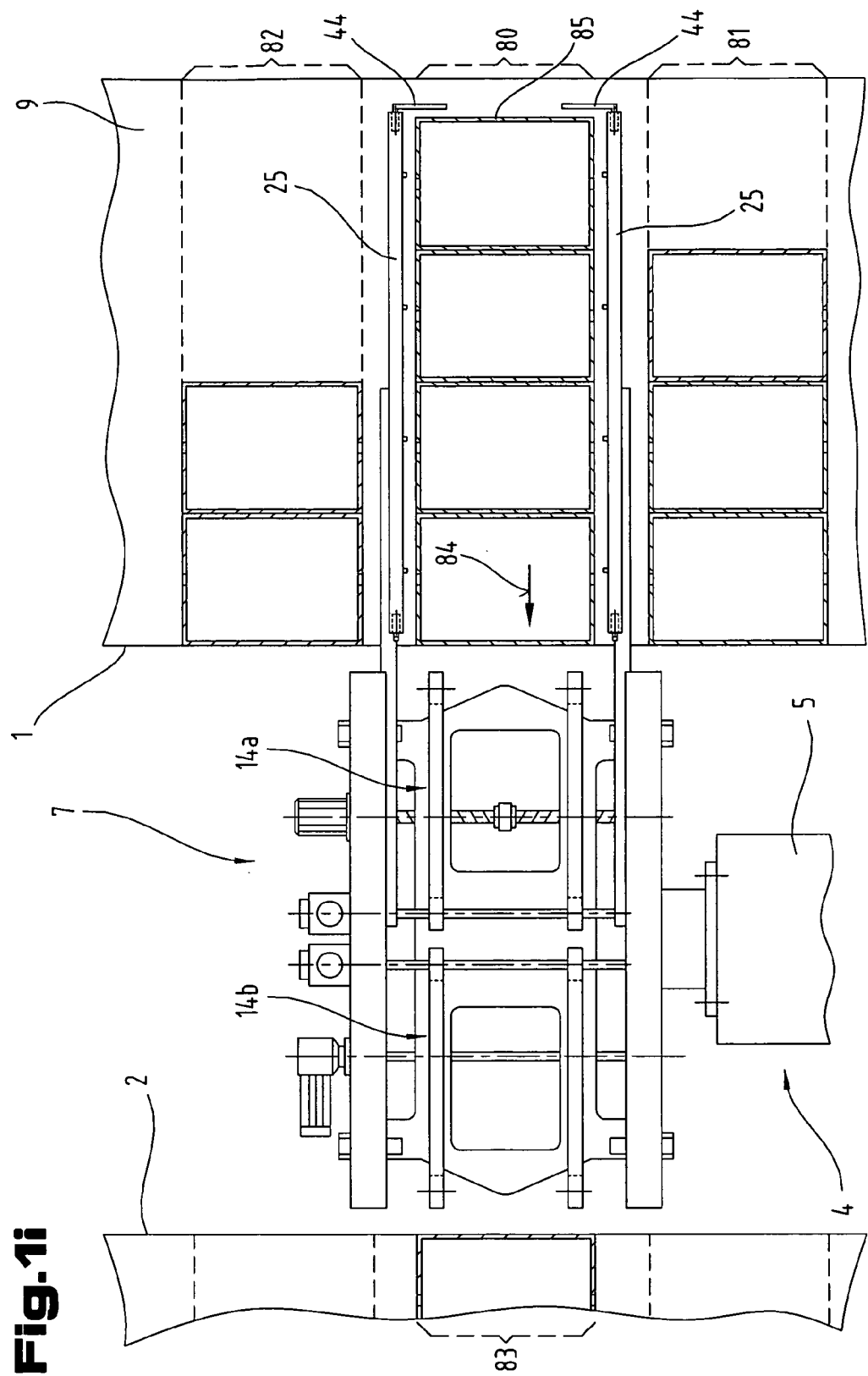

With reference to FIGS. 1*i* and 1*j* the method is described for unloading loading auxiliary means 8 with the transport device 7 from the shelf compartment 9 or storage channel 80 of the shelf systems 1, 2. Here different unloading situations are possible.

If not all loading auxiliary means 8 for a picking order can be accommodated in only one storage channel 80 to 83, the loading auxiliary means 8 belonging to said picking order that is not included is placed in a different storage channel 80.

If said loading auxiliary means 8 placed in the storage channel 80 has to be removed, firstly the transport device 7 is moved by means of the conveying unit 4 into the storage position determined by the computer system in front of the storage channel 80. Once the storage position has been reached the transport device 7 is moved until its conveying plane 78 and a storage surface of the shelf compartment 9 are in alignment and the transport device 7 is positioned centrally to the loading auxiliary means 8 placed behind one another.

The telescopic arms 13a, 13b are moved into the opening position 16 and completely extended. Afterwards the rear stop devices 44 in unloading direction 84 are moved out of their starting position into the operating position shown in the Figures, in which the stop devices 44 are located behind the rear wall 85 of the loading auxiliary means 8 stored in the rear storage space 11d.

Then the telescopic arms 13a, 13b are moved in synchronously and the closely adjacent loading auxiliary means 8 are only moved so far in the direction of the transport device 7 of the conveying unit 4, that the front conveying device 14a in the unloading direction 84 grips the front loading auxiliary means 8 and shifts onto the latter or the conveying plane 78 of the transport device 7 can take over the front loading auxiliary means 8, as shown in FIG. 1j. The loading auxiliary means 8 are loaded during the unloading movement by the transport device 7; 90, in particular the stop device(s) 44; 96; 97, by a feed force and moved onto the horizontal bearing surface in the direction of the conveying unit 4. At the same time also the conveying device 14a is driven in the unloading direction 84. The conveying speed of the conveying devices 14a corresponds to the retraction speed of the telescopic arms 13a, 13b. Said loading auxiliary means 8 is positioned by the conveying device 14a and if necessary the conveying device 14b on the platform 6 in the manner described above.

The loading auxiliary means 8 left in the storage channel 80 are only moved so far that the loading auxiliary means 8 are in the corresponding storage space 11a to 11c and a front edge of the shelf compartment 9 and the front side wall of the loading auxiliary means 8 are essentially in alignment.

If for a picking order two further loading auxiliary means 8 could not be accommodated in only one storage channel 80 to 83, the latter are placed in a different storage channel 80.

During the unloading the telescopic arms 13a, 13b are only partly retracted and the loading auxiliary means 8 are moved only so far in the direction of the transport device 7 of the conveying unit 4 that the two front loading auxiliary means 8 in unloading direction 84 can be gripped one after the other by the front conveying device 14a or the conveying plane 78 of the transport device 7 can take over the two loading auxiliary means 8. The loading auxiliary means 8 are charged during the removal movement by the transport device 7; 90, in particular the stop device(s) 44; 96; 97 by a feed force and moved on the horizontal bearing surface in the direction of the conveying unit 4. At the same time also the conveying device 14a is driven in removal direction 84. The conveying speed of the conveying devices 14a corresponds to the retraction speed of the telescopic arms 13a, 13b.

The loading auxiliary means 8 are then positioned by the conveying device 14a and if necessary the conveying device 14b on the platform 6 as described above.

If the loading auxiliary means 8 associated with a picking order need to be moved from the shelf compartment 9 or storage channel 80, the telescopic arms 13a, 13b are completely retracted and in this case all loading auxiliary means 8 are pushed in the direction of the trans-port device 7 and taken over onto the conveying plane 78. At the same time the conveying devices 14a, 14b are also driven in unloading direction 84. The conveying speed of the conveying devices 14a, 14b corresponds to the retraction speed of the telescopic arms 13a, 13b.

Preferably, during the movement of the transport device 7 to the unloading conveying means (not shown) or loading station both the right and left stop devices 44, 45 are adjusted in their operating position, as indicated in FIG. 1b. In this way during the driving movement of the drive unit 4 the secure transport of the loading auxiliary means 8 is possible and errors in the storage system can be avoided.

FIG. 5 shows a further embodiment of the transport device 90 for inserting and removing loading auxiliary means 8 into and out of a shelf compartment 9 of the shelf systems 1, 2 set up on both sides, which comprises a support plate 91, on which an extending unit comprising parallel telescopic arms 92a, 92b is mounted and between the latter a conveying device 93, for example a two track conveyor.

The transport device 7 can either mount two loading auxiliary means 8 with dimensions 300 mm×400 mm in transverse movement or one loading auxiliary means 8 with dimensions 600 mm×400 mm in longitudinal movement.

The support frames 23 of the telescopic arms 92a, 92b are fixed onto the support plate 91. The conveying device 93 is coupled onto a drive motor 94. The transport device 90 or one of the telescopic arms 92a, 92b of the removing unit additionally comprises stop devices 96, 97 which can be moved by means of independently controllable control motors 95 between the aforementioned starting position and operating position. Between the stop devices 96, 97 the transport device 90 comprises knob-like drive members 98, which are mounted respectively on the support plate 91 to be relatively adjustable by means of a control drive 99 between a drawn back basic position and an advanced conveying position. The control drive 99 comprises a fluid cylinder, which is coupled with the drive member 98. Each drive member 98 is mounted axially displaceably in a guide (not shown) on the upper slide 25 of one of the telescopic arms 92a, 92b. The telescopic arms 13a, 13b can be extended telescopically by a drive motor 102 of a control drive in relation to the platform 6 in both directions, as described in FIG. 4.

The displacement path 57 of the drive member 98 is smaller than the displacement path 56 of the stop device 96, 97, wherein the displacement path 56 is determined so that the stop device 96, 97 is adjusted in the operating position beyond the side wall 52 in front of and/or behind the loading auxiliary means 8.

As shown in FIG. 5, the fixed telescopic arm 92b or upper slide 25 and the drive members 98 can also comprise relatively adjustable alignment surfaces 100, 101 that can be adjusted into an alignment or centring position and placed against the side walls 52 that are parallel in the direction of insertion 10. In other words the drive members 98 additionally form an alignment device for loading auxiliary means 8 provided on the conveying device 93.

According to this embodiment the loading auxiliary means 8 is gripped during the insertion process on one side by friction (alignment surfaces 100) and on the opposite side by engagement (drive members 98).

The embodiment of the transport device 90 or extending unit shown in FIG. 5 can also be provided with only one drive member 98 which can be adjusted between the retracted basic position and the advanced conveying position and/or a stop device 96 which can be moved between the aforementioned starting position and the operating position. This is the case for example if the storage system only has a shelf system 1 on one side of the aisle 3.

The described transport device 7 and the method can also be used very efficiently in the embodiment shown in FIG. 5, where the shelf compartments 9 of the shelf systems 1, 2 are designed respectively only to have a front and a rear row of storage spaces 11a, 11b.

Even if in the preceding exemplary embodiments the engaging connection between the drive member 54a, 54b; 98 and the drive opening 55 is shown on the side walls 52 of the loading auxiliary means 8, it is equally possible for a drive opening to be provided on the base of the loading auxiliary means 8 and the drive member to be adjustable from a base position below the transport plane into a conveying position projecting on the conveying planer and in this way to engage positively with the drive opening 55.

Furthermore, it is also possible for packaged goods, for example packaged units to be manipulated without loading auxiliary means 8 in the manner described above by the transport device 7; 90.

Finally, as a point of formality, it should be noted that for a better understanding of the structure of the transport device 7 the latter and its components have not been represented true to scale in part and/or have been enlarged and/or reduced in size.

List Of Reference Numerals

| | |
|---|---|
| 1 | Shelf system |
| 2 | Shelf system |
| 3 | Aisle |
| 4 | Conveying unit |
| 5 | Mast |
| 6 | Platform |
| 7 | Transport device |
| 8 | Loading auxiliary means |
| 9 | Shelf compartment |
| 10 | Introduction direction |
| 11a | Storage space |
| 11b | Storage space |
| 11c | Storage space |
| 11d | Storage space |
| 12 | Support plate |
| 13a | Telescopic arm |
| 13b | Telescopic arm |
| 14a | Conveying device |
| 14b | Conveying device |
| 15a | Drive motor |
| 15b | Drive motor |
| 16 | Opening position |
| 17 | Closing position |
| 18 | Control motor |
| 19 | Spindle |
| 20a | Bearing element |
| 20b | Bearing element |
| 20c | Bearing element |
| 21 | Securing angle |
| 22a | Guiding arrangement |
| 22b | Guiding arrangement |
| 23 | Support frame |
| 24c | Middle slide |
| 25 | Upper slide |
| 26 | Side wall |
| 27 | Side wall |
| 28 | Side wall |
| 29 | Side wall |
| 30 | Guiding arrangement |
| 31 | Lateral guiding track |
| 32 | Vertical guiding track |
| 33 | Base |
| 34 | Arm |
| 35 | Guiding arrangement |
| 36 | Lateral guiding track |
| 37 | Vertical guiding track |
| 38 | Lower side |

-continued

| | |
|---|---|
| 39 | Upper side |
| 40 | Guiding web |
| 41 | Guiding web |
| 42 | Slide strip |
| 43 | Control motor |
| 44 | Stop device |
| 45 | Stop device |
| 46 | Recess |
| 47 | Movement path |
| 48 | Axis |
| 49 | |
| 50 | Sensor |
| 51 | Sensor |
| 52 | Side wall |
| 53 | Alignment surface |
| 54a | Drive member |
| 54b | Drive member |
| 55 | Drive opening |
| 56 | Adjusting path |
| 57 | Adjusting path |
| 58 | Prezone |
| 59 | Conveying device |
| 60 | Drive wheel |
| 61 | Guiding wheel |
| 62 | Guiding wheel |
| 63 | Click wheel |
| 64 | Tensioning means |
| 65 | Drive shaft |
| 66 | Drive motor |
| 67 | Drive member |
| 68 | Tensioning means |
| 69 | Tensioning means |
| 70 | Clamping device |
| 71 | Clamping device |
| 72 | Roller |
| 73 | Clamping device |
| 74 | Clamping device |
| 75 | Roller |
| 76 | Guiding element |
| 77 | Guiding element |
| 78 | Conveying plane |
| 79 | |
| 80 | Storage channel |
| 81 | Storage channel |
| 82 | Storage channel |
| 83 | Storage channel |
| 84 | Unloading direction |
| 85 | Rear wall |
| 90 | Transport device |
| 91 | Support plate |
| 92a | Telescopic arm |
| 92b | Telescopic arm |
| 93 | Conveying devoce |
| 94 | Drive motor |
| 95 | Control motor |
| 96 | Stop device |
| 97 | Stop device |
| 98 | Drive member |
| 99 | Control drive |
| 100 | Alignment surface |
| 101 | Alignment surface |
| 102 | Drive motor |

The invention claimed is:

1. A method for storing loading auxiliary structures to storage spaces of a shelf compartment and for removing the loading auxiliary structures from the storage spaces of the shelf compartment by means of a transport device, the shelf compartment thereby comprises at least a first storage space (11a) and a second storage space (11b) arranged one behind the other in a direction of storing (10);

the transport device being adjustable relative to the shelf compartment and comprising a support plate (12) for receiving loading auxiliary structures and a storing and removing unit mounted on the support plate and being adjustable in the direction of storing relative to the first and second storage spaces; and the storing and removing unit having a drive member (54a, 54b; 98) for storing loading auxiliary structures and a stop device (44, 45; 96, 97) for positioning and removing the loading auxiliary structures, the stop device of the storing and removing unit being arranged at its front end in the direction of storing;

the method for storing the loading auxiliary structures comprising steps of:

i) positioning of a first loading auxiliary structure relative to the support plate against the stop device, ii) conveying the first loading auxiliary structure from the support plate onto the first storage space of the shelf compartment by the drive member of the storing and removing unit, wherein the drive member of the storing and removing unit is moved towards the first loading auxiliary structure positioned relative to the support plate and grips the first loading auxiliary structure in a positive manner on a side wall of the first loading auxiliary structure or on a base of the first loading auxiliary structure, and wherein the first loading auxiliary structure gripped by means of the dive member is moved onto the first storage space of the shelf compartment, and iii) positioning of a second loading auxiliary structure relative to the support plate against the stop device, iv) conveying the second loading auxiliary structure from the support plate onto the first storage space of the shelf compartment by the drive member of the storing and removing unit in the same manner as the first loading auxiliary structure such that the second loading auxiliary structure is conveyed in the direction of storing and thereby pushes the first loading auxiliary structure from the first storage space onto the second storage space disposed behind the first storage space so that the first and second loading auxiliary structures are deposited within the shelf compartment and abutting one after another in the direction of storing, wherein the drive member applies a forward driving force to the second loading auxiliary structure until the second loading auxiliary structure reaches the first storage space, the method for removing at least two loading auxiliary structures together in a single removal movement comprising steps of:

i) positioning the support plate in front of the first storage space of the shelf compartment, ii) adjusting the stop device behind a rear wall (85) of the first loading auxiliary structure facing away from the support plate, and iii) conveying the first and the second loading auxiliary structures by means of the stop device together in a direction of unloading (84) in such a manner that the first and second loading auxiliary structures abutting one after another in the direction of unloading (84) and the stop device contact a rear wall only of the first loading auxiliary structure.

2. The method according to claim 1, wherein the method further comprises:

positioning the first and second loading auxiliary structures one after another relative to the support plate in the direction of storing by means of the stop device and also parallel to the direction of storing by means of an alignment device of the transport device.

3. The method according to claim 1, wherein each of the first and second loading auxiliary structures has a drive opening and is positioned one after another relative to the support plate against the stop device, and wherein when the respective loading auxiliary structure has been positioned against the stop device, the drive member is disposed opposite the drive opening in such a manner that the drive member can engage with the drive opening.

4. The method according to claim 1, wherein during the removal the first loading auxiliary structure and the second loading auxiliary structure are only moved so far in the direction of unloading that one or both are passed from the shelf compartment to the support plate.

5. The method according to claim 1, wherein the method comprises:

positioning of a third loading auxiliary structure relative to the support plate against the stop device conveying the third loading auxiliary structure from the support plate onto the first storage space of the shelf compartment by the drive member of the storing and removing unit in the same manner as the first loading auxiliary structure, such that the third loading auxiliary structure is conveyed in the direction of storing and thereby pushes the first and second loading auxiliary structures from the storage spaces onto the second storage space and a third storage space disposed behind the first storage space so that the first, second and third loading auxiliary structures are deposited within the shelf compartment and abutting one after another in the direction of storing.

6. The method according to claim 5, wherein the method comprises steps of:

i) positioning the support plate in front of the first storage space of the shelf compartment, ii) adjusting the stop device behind a rear wall of the first loading auxiliary structure facing away from the support plate, and iii) conveying the first, second and third loading auxiliary structures by means of the stop device together in a direction of unloading in such a manner that the first, second and third loading auxiliary structures abutting one after another in the direction of unloading and the sop device contact a rear wall only of the first loading auxiliary structure.

7. A method for storing loading auxiliary structures to storage spaces of a shelf compartment and for removing the loading auxiliary structures from the storage spaces of the shelf compartment by means of a transport device, the shelf compartment thereby comprises at least a first storage space (11a), a second storage space (11b) and a third storage space (11c) arranged one behind the other in a direction of storing (10);

the transport device being adjustable relative to the shelf compartment and comprising a support plate (12) for receiving loading auxiliary structures and a storing and removing unit mounted on the support plate and being adjustable in the direction of storing relative to the first, second and third storage spaces;

the storing and removing unit having a first drive member (54, 54b; 98) and a second drive member (54, 54b; 98) for storing loading auxiliary structures and a stop device (44, 45; 96, 97) for positioning and removing the loading auxiliary structures, the first and second drive members of the storing and removing unit arranged in series in the direction of storing and the stop device of the storing and removing unit being arranged at its front end in the direction of storing;

the method for storing the loading auxiliary structures comprising steps of:
i) positioning of a first loading auxiliary structure relative to the support plate against the stop device, ii) conveying the first loading auxiliary structure from the support plate onto the first storage space of the shelf compartment by the first drive member of the storing and removing unit,
wherein the first drive member of the storing and removing unit is moved towards the first loading auxiliary structure positioned relative to the support plate and grips the first loading auxiliary structure in a positive manner on a side wall of the first loading auxiliary structure or on a base of the first loading auxiliary structure, and
wherein the first loading auxiliary structure gripped by means of the first drive member is moved onto the first storage space of the shelf compartment, and
iii) positioning of a group of a second and a third loading auxiliary structures relative to the support plate against the stop device,
iv) conveying the second and third loading auxiliary structures from the support plate onto the first and second storage spaces of the shelf compartment by the first and second drive members of the storing and removing unit in the same manner as the first loading auxiliary structure such that the second and third loading auxiliary structures are conveyed together in the direction of storing and thereby push the first loading auxiliary structure from the first storage space onto the third storage space disposed behind the first and second storage spaces so that the first, second and third loading auxiliary structures are deposited within the shelf compartment and abutting one after another in the direction of storing,
wherein the first and second drive members apply a forward driving force to the second and third loading auxiliary structures until the second and third loading auxiliary structures reach the first and second storage spaces,
the method for removing at least two loading auxiliary structures together in a single removal movement comprising steps of:
i) positioning the support plate in front of the first storage space of the shelf compartment,
ii) adjusting the stop device behind a rear wall (85) of the first loading auxiliary structure facing away from the support plate, and
iii) conveying the first, second and the third loading auxiliary structures by means of the stop device together in a direction of unloading (84) in such a manner that the first, second and third loading auxiliary structures abutting one after another in the direction of unloading (84) and the stop device contact a rear wall only of the first loading auxiliary structure.

* * * * *